Oct. 2, 1962   W. RUF   3,056,310
STEERING GEAR ARRANGEMENTS FOR TRACK-LAYING VEHICLES
Filed Nov. 12, 1957

INVENTOR.
WALTER RUF
BY Robert E. Burns
ATTORNEY 3,056,310
STEERING GEAR ARRANGEMENTS FOR
TRACK-LAYING VEHICLES
Walter Ruf, Landhaus am See, Bottighofen, Switzerland
Filed Nov. 12, 1957, Ser. No. 695,836
Claims priority, application Switzerland Dec. 21, 1956
3 Claims. (Cl. 74—378)

This invention relates to steering gear arrangements for track-laying vehicles.

According to the invention, for the purpose of permitting drive of the two tracks in opposite directions to enable the vehicle to turn on the spot, one part of the driving or live axle is connected positively to the driving shaft while another part is provided with means for selectively connecting it to the first-mentioned part so that it is fast in a rotational sense therewith or for causing it to rotate in the reverse direction.

Such gear arrangement for turning on the spot can be employed, for example, in the known clutch-brake steering systems or in single and multi-radius steering systems.

Figure 1:
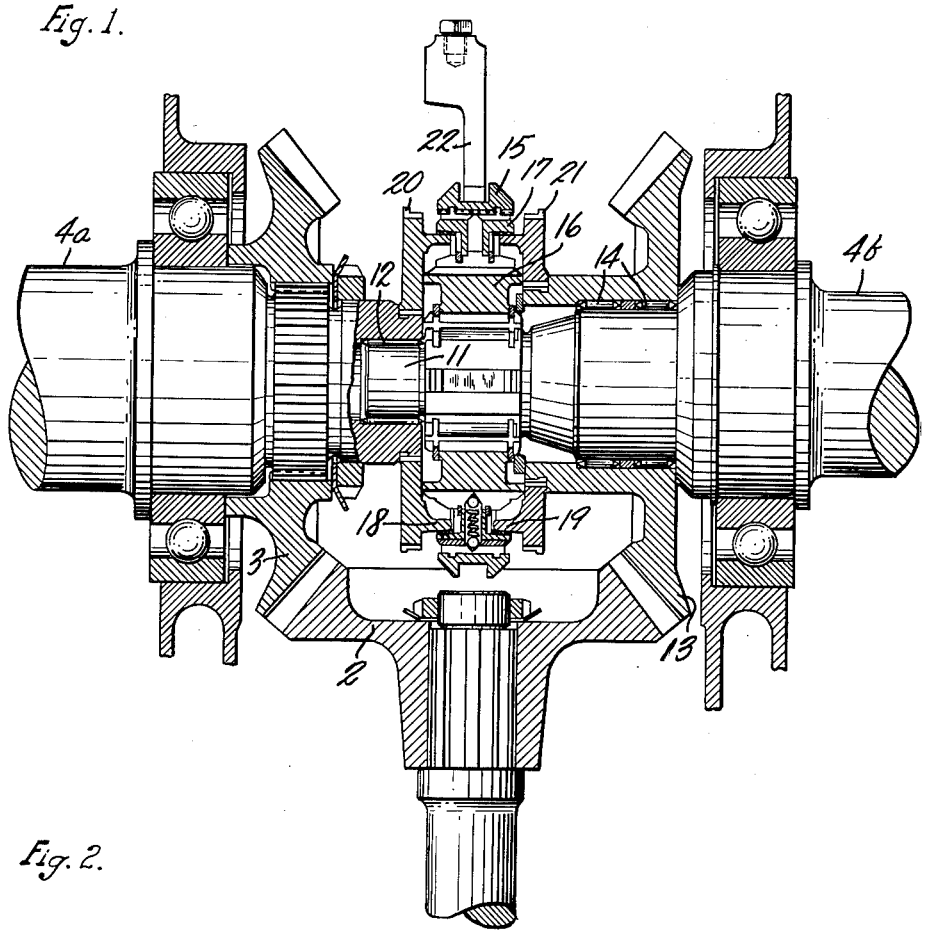
Figure 2:
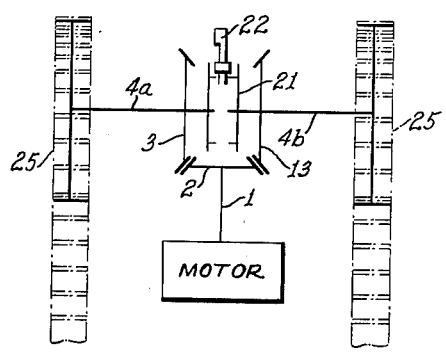

An illustrative embodiment of the invention will now be described in detail with reference to the accompanying drawing wherein FIG. 1 is a cross-sectional view, partly in elevation, of a steering and driving mechanism embodying features of the present invention; and FIG. 2 is a diagrammatic view of a portion of a track-laying vehicle provided with the steering and driving mechanism shown in FIG. 1.

According to the drawing, the drive is transmitted positively from the shaft 1 by way of the bevel gears 2 and 3 to the part 4a of the driving axle. The opposite part 4b of the driving axle is rotatably mounted in the part 4a by means of the journal 11 and the needle bearing 12. The bevel gear 3 mounted on the part 4a is arranged coaxially with the bevel gear 13 which is rotatably mounted on the part 4b by means of the needle bearing 14. The bevel gear 13 is the same size as the bevel gear 3 and the bevel gear 2 is constantly in engagement with both the bevel gears 3 and 13. A longitudinally displaceable coupling sleeve 15 is connected to the part 4b so that it is fast in a rotational sense therewith by way of the ring 16 fixed to the part 4b and by way of the synchronizing sleeve 17 displaceable longitudinally on the ring, which latter sleeve can co-operate selectively with the cone rings 18 and 19 of the toothed rims 20 and 21. The coupling sleeve 15 is slidable on the synchronizing sleeve 17 and can be connected selectively with the toothed rim 20 or 21 so that it is fast in a rotational sense therewith by means of the shift fork 22, synchronization of the rotating movements of the parts to be connected taking place beforehand each time in known manner. The toothed rim 20 is fixedly connected to the part 4a and the toothed rim 21 is fixedly connected to the bevel gear 13.

For traveling straight ahead the coupling sleeve 15 is slidably engaged with the toothed rim 20 thereby connecting the parts 4a and 4b to one another so that they are fast with each other in a rotational sense. The bevel gear 13 turns idly in the opposite direction and in this case does not perform any function. If the vehicle is to be turned on the spot, that is the two tracks 25 are to be driven in opposite directions at the same speed, the coupling sleeve 15 is slidably engaged with the toothed rim 21, so that the opposite movement of the bevel gear 13 is transmitted to the part 4b. In this way the part 4b can be selectively connected to the part 4a so that it is fast in a rotational sense therewith or caused to rotate in the reverse direction.

The coupling sleeve does not necessarily require the cooperation of a locking synchronizing arrangement. The coupling sleeve could be mounted slidably, but fast in a rotational sense, directly on the part 4b.

The construction described above can be used to direct the vehicle in a plurality of directions, even though a single direction of turning is involved. For example, if the vehicle is moving forwardly with the drive shaft 1 rotating clockwise in the direction of movement, with the two shaft parts connected for simultaneous rotation in the same direction, when the coupling sleeve is shifted to connect the toothed rim 21 to drive the bevel gear 13 so that the shaft 4b will turn in the opposite direction, the vehicle will start to turn to the right. If a right turn is desired, such turning will be discontinued by appropriate shift of the coupling sleeve after a turn of 90° has been made. If it is desired to cause the vehicle to move in the opposite direction from its initial forward direction, turning will be continued until a 180° turn has been made before the coupling sleeve is shifted. If it is desired to turn to the left from the original direction of travel, then turning will be permitted for 270°, at which time the vehicle will be facing to the left from its original position, and the coupling sleeve will again be shifted.

What is claimed is:

1. In a track-laying vehicle having a first wheel on one side of the vehicle for driving a track on said side and a second wheel on the opposite side of said vehicle for driving a track on said opposite side, a steering and driving mechanism for continuously driving the tracks on opposite sides of said vehicle at all times during operation of the vehicle, said mechanism comprising a driving shaft, a first axle carrying said first wheel and adapted to drive one of said tracks and positively connectible at right angles in driving relationship with said driving shaft, a second axle carrying said second wheel and adapted to drive the other track of the vehicle and co-axially aligned with said first axle, and single shifting means apart from said axles and movable relatively to both of said axles without axial movement of said axles for selectively connecting said second axle for driving connection with said first axle or for driving connection with said driving shaft to rotate in a direction opposite to the direction of rotation of said first axle, whereby said first axle and said second axle are both continuously driven whenever said driving shaft rotates, but wherein said axles may be concurrently driven either in the same direction or in opposite directions and said tracks are correspondingly driven in the same direction or in opposite directions.

2. A track-laying vehicle having a steering and driving mechanism as defined in claim 1, wherein on the driving shaft there is mounted a first bevel gear which is in mesh with two second bevel gears arranged coaxially with one another, one of said second gears being mounted on the first axle and the other second gear being rotatably mounted on the second axle, and said means comprises a slidable coupling sleeve connected fast in a rotational sense to the second axle and, for travelling straight ahead, is adapted to be connected to the first axle and, for turning on the spot, to the bevel gear rotatably mounted on the second axle.

3. A track-laying vehicle having a steering and driving mechanism as defined in claim 2, further comprising a synchronizing sleeve underlying said slidable coupling sleeve and meshing therewith.

References Cited in the file of this patent

UNITED STATES PATENTS

| | | |
|---|---|---|
| 1,406,446 | Custer | Feb. 14, 1922 |
| 2,091,557 | Montgomery | Aug. 31, 1937 |
| 2,447,136 | Putz | Aug. 17, 1948 |
| 2,575,522 | McFarland | Nov. 20, 1951 |
| 2,692,514 | O'Leary | Oct. 26, 1954 |

FOREIGN PATENTS

| | | |
|---|---|---|
| 844,711 | Germany | July 24, 1952 |